Figure 9:
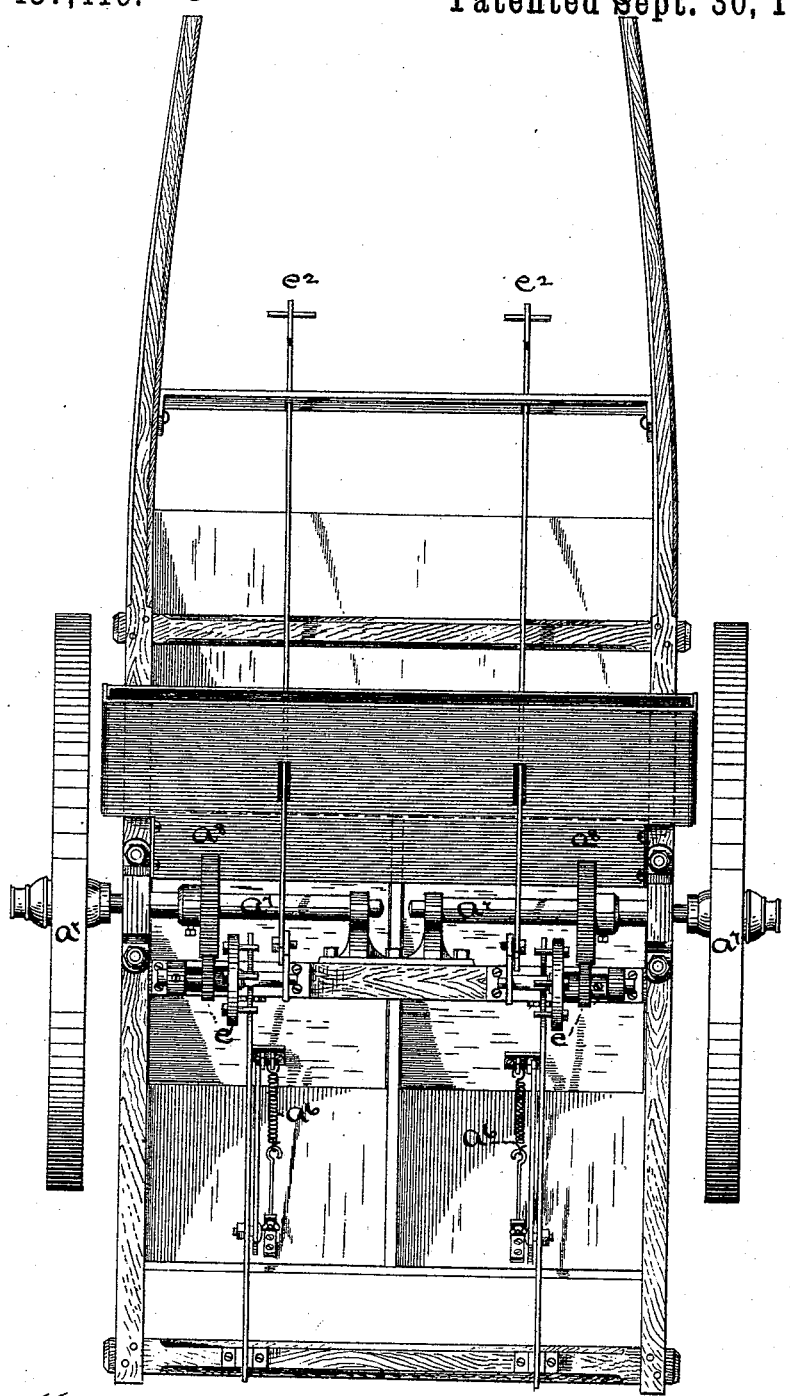

(No Model.) 3 Sheets—Sheet 1.
W. T. BUTLER.
APPARATUS FOR SPREADING FERTILIZING MATERIAL.
No. 437,419. Patented Sept. 30, 1890.
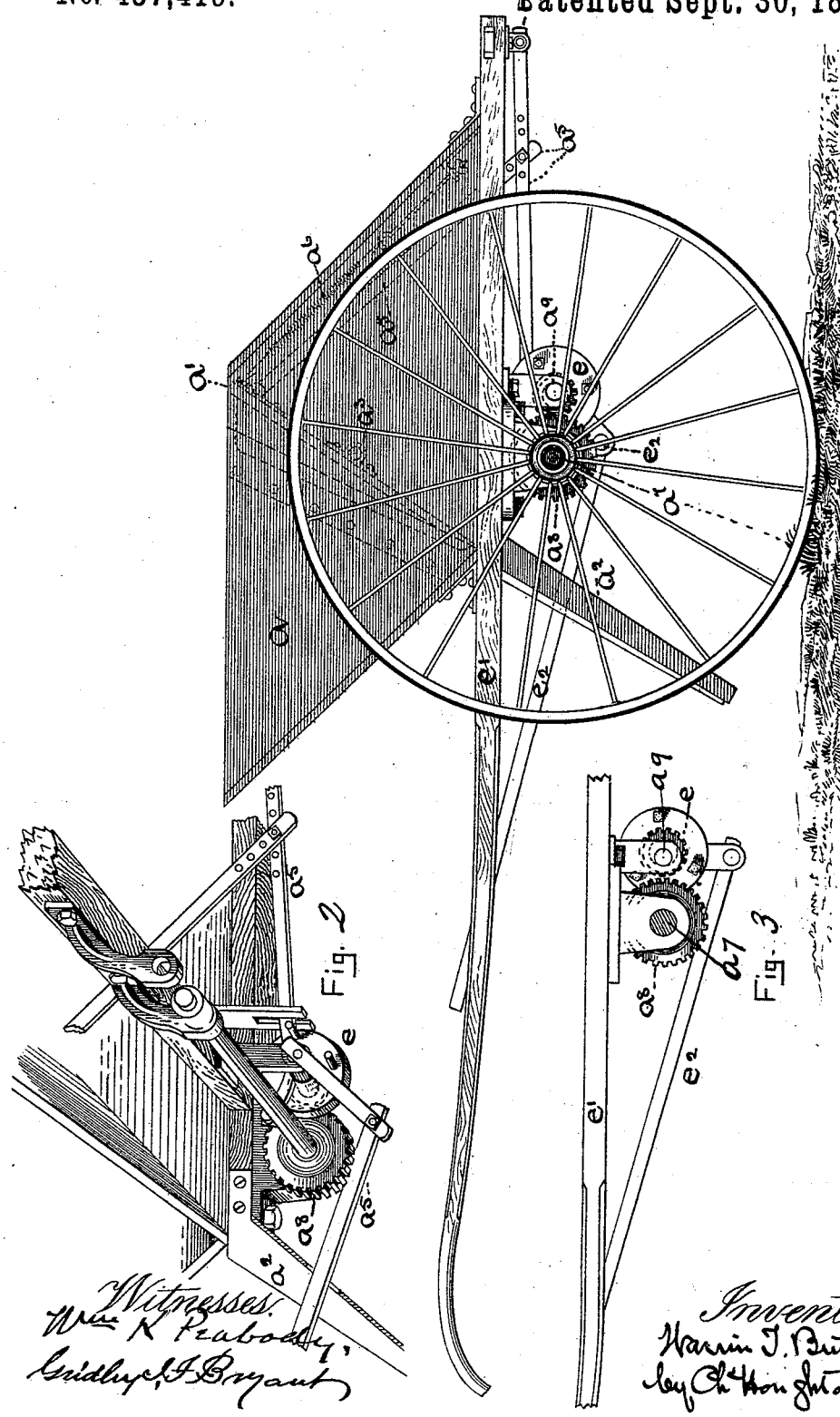

(No Model.) 3 Sheets—Sheet 2.
W. T. BUTLER.
APPARATUS FOR SPREADING FERTILIZING MATERIAL.
No. 437,419. Patented Sept. 30, 1890.
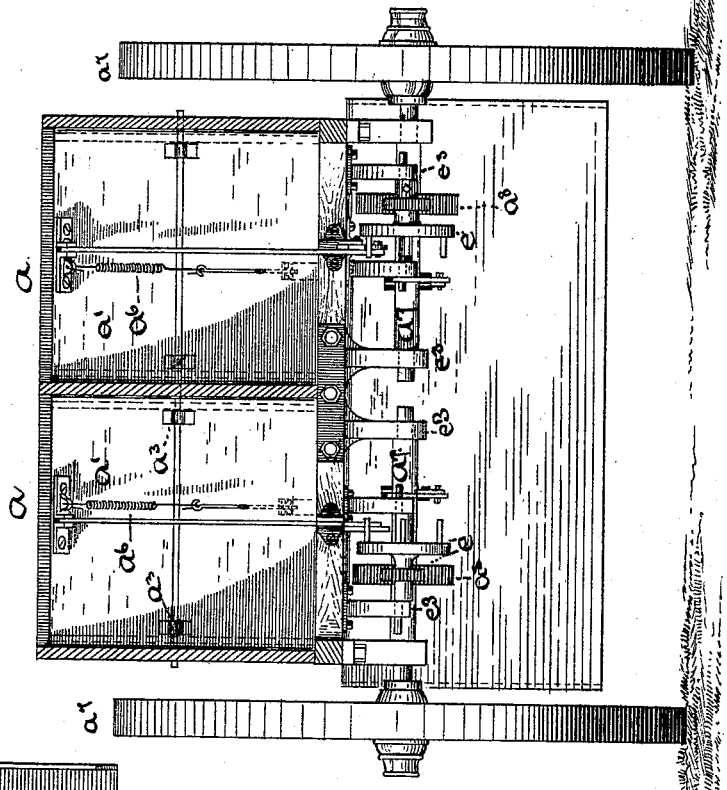
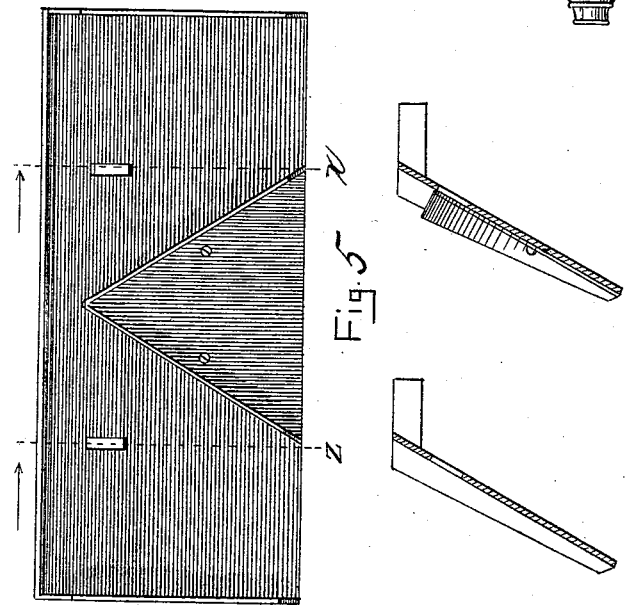
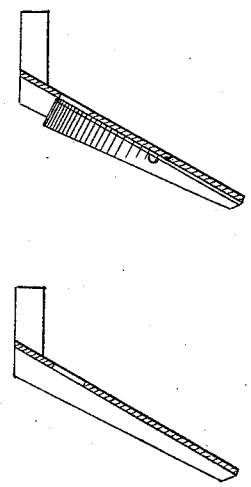
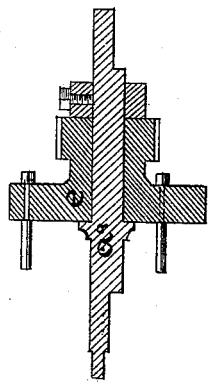

(No Model.) 3 Sheets—Sheet 3.

W. T. BUTLER.
APPARATUS FOR SPREADING FERTILIZING MATERIAL.

No. 437,419. Patented Sept. 30, 1890.

Witnesses.
Wm. K. Peabody.
Cudley F. Bryant.

Inventor
Warren T. Butler
by Chs. Houghton Atty

UNITED STATES PATENT OFFICE.

WARREN T. BUTLER, OF CHELSEA, ASSIGNOR TO CHARLES HOUGHTON, TRUSTEE, OF BOSTON, MASSACHUSETTS.

APPARATUS FOR SPREADING FERTILIZING MATERIAL.

SPECIFICATION forming part of Letters Patent No. 437,419, dated September 30, 1890.

Application filed April 28, 1888. Serial No. 272,205. (No model.)

*To all whom it may concern:*

Be it known that I, WARREN T. BUTLER, of Chelsea, in the county of Suffolk and Commonwealth of Massachusetts, have invented a new and useful Improvement in Apparatus for Spreading Fertilizing Material, of which the following is a specification.

The invention relates to the mechanism employed, the object of it being to produce an apparatus which, being moved on wheels over the ground, will evenly spread on the surface any granulated substance placed in it; and it consists in a hopper having a vibrating gate in an opening at the lower part mounted on two wheels, each of which is affixed to a separate independent axle which revolves with its wheel and carries a system of gears and levers which, actuated by the rotary motion of the wheel and axle, keep the gate at the lower part of the hopper in a state of continual vibration when the apparatus is in motion, causing a constant and uniform discharge of the granulated substance from the hopper through a chute to the ground. This apparatus I will call a "spreader."

In the drawings annexed there are two hoppers shown, and all the parts of the mechanism in duplicate.

Figure 1 shows a side view of the "spreader," as I designate it. Fig. 2 shows a detail of one of the axles of the spreader and the method of affixing it to the under side of the spreader, a gear on it, and levers by which the gate is vibrated. Fig. 3 shows detail of devices by which the mechanism for vibrating the gate may be thrown into working contact or the reverse. Fig. 4 shows a rear elevation of the spreader in partial sections with the back of the hopper cut away to exhibit mechanism of the working parts. Fig. 5 shows front side of the chute for conducting granulated substances from the gate-opening at the lower part of the hopper to the ground, upon which a V-shaped device is secured to throw it into rows when it is desirable to do so. This device is removable and will be used only when it is required. Fig. 6 shows a transverse section of the chute on line X. Fig. 7 shows a transverse section of the chute on line Z. Fig. 8 shows a longitudinal section of a pin-wheel which comes in contact with the working levers and the gear which is integral with it, by which it is moved, and the shaft by which it is supported and upon which it turns. Fig. 9 shows a bottom plan of the spreader and its working mechanism.

$a$ marks the hopper which is to contain the granulated substance to be spread on the ground.

$a'$ marks a vibrating gate in the lower part of the hopper upon which the granulated substance to be spread rests and by the motion of which it is agitated and made to fall down through the chute.

$a^2$ marks the chute which conducts the granulated material from the hopper to the ground.

$a^3$ marks the fulcrum upon which the gate $a'$ vibrates or oscillates.

$a^4$ marks the fulcrum of the series of levers by which the gate $a'$ is vibrated.

$a^5$ marks the compound levers which move the gate $a'$.

$a^6$ marks a spring which acts in opposition to the levers $a^5$ and brings the gate $a'$ back after it has been lifted by the levers $a^5$.

$a^7$ marks the wheels which support the spreader and the axles to which they are affixed and by the rotary motion of which its mechanism is actuated.

$a^8$ marks a gear on the axle of the wheel $a^7$. This gear works into and turns a smaller gear on a shaft, which is described below.

$a^9$ marks a shaft with eccentric-bearing suspended in suitable hangers near to and parallel with the axle, bearing a gear which in position matches into and moves with the gear $a^8$, and which is affixed to and integral with a pin-wheel, described below. By turning the shaft $a^9$ partly around on its eccentric the gear on it is made to engage or disengage the gear $a^8$.

$e$ marks a pin-wheel and a gear which are integral and turn together on the shaft $a^9$, which by a partial rotation on its eccentric-bearing engages the teeth of this gear with those of the gear $a^8$ on the axle $a^7$, so that when the apparatus is moving on the wheels $a^7$ the shaft $a^9$ is rotated, setting this gear and the pin-wheel $e$ in motion, by which the levers $a^5$ are raised up and the gate $a'$ put in vibratory motion by them and the opposing force of the spring $a^6$.

$e'$ marks the handles by which the apparatus is moved.

$e^2$ marks the levers by which the shaft $a^9$ is turned partly around on its eccentric to bring the gears $a^8$ and $e$ into contact.

$e^3$ marks the hangers which support the shaft $a^9$.

The apparatus shown and described consists of two hoppers and the mechanism for operating the same; but, as each hopper is wholly disconnected with and independent of the other, one or three or four or even more may be mounted on the wheels and drawn by a horse, thus covering more ground when that is desirable.

Grain—such as wheat, rye, oats, and other seeds—may be sown by this apparatus more evenly than by hand.

To use this apparatus, the hoppers are filled with fertilizer, grain, or the substance to be spread and it is propelled by a man walking between the handles and pushing or drawing it.

In a larger apparatus a horse may be used.

I claim as new and my invention—

The above-described fertilizer-spreader, consisting of the bearing and driving wheels $a^7$, the hopper $a$, with its vibrating gate $a'$, the pin-wheel and gear $e$, the chute $a^2$, the levers $a^5$, the spring $a^6$, the propelling-handles $e'$, and the lever $e^2$, all substantially as described.

WARREN T. BUTLER.

Witnesses:
CHAS. HOUGHTON,
WM. E. PEABODY.